US006758303B2

(12) United States Patent
Zurek et al.

(10) Patent No.: US 6,758,303 B2
(45) Date of Patent: Jul. 6, 2004

(54) ELECTRONIC DEVICE HAVING A MULTI-MODE ACOUSTIC SYSTEM AND METHOD FOR RADIATING SOUND WAVES

(75) Inventors: Robert A. Zurek, Antioch, IL (US); Simone Koo, Palatine, IL (US); Thomas Gitzinger, Palatine, IL (US); Chris Gremo, Algonquin, IL (US); Thomas Walczak, Woodstock, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/284,745

(22) Filed: Oct. 31, 2002

(65) Prior Publication Data

US 2004/0084244 A1 May 6, 2004

(51) Int. Cl.[7] .............................. H05K 5/00; H04R 1/02; H04M 1/02
(52) U.S. Cl. ...................... 181/155; 181/160; 381/351; 381/357; 381/335; 379/420.02; 455/569.1
(58) Field of Search .................................. 181/155, 156, 181/145, 160, 199; 381/345, 349, 350, 351, 163, 357, 335; 379/420.01, 420.02, 428.01, 432, 433.02; 455/569.1

(56) References Cited

U.S. PATENT DOCUMENTS

| 5,184,332 A | * | 2/1993 | Butler ........................ 181/160 |
| 5,590,208 A | * | 12/1996 | Koyano et al. .............. 181/156 |
| 5,790,679 A | * | 8/1998 | Hawker et al. .............. 381/163 |
| 5,796,822 A | | 8/1998 | Larson et al. |
| 6,002,949 A | * | 12/1999 | Hawker et al. ........... 455/569.1 |
| 6,058,315 A | | 5/2000 | Clark |
| 6,064,894 A | | 5/2000 | Zurek et al. |
| 6,104,808 A | * | 8/2000 | Alameh et al. ......... 379/433.02 |
| 6,144,738 A | * | 11/2000 | Hawker et al. ......... 379/433.02 |
| 6,148,080 A | * | 11/2000 | Collin .................... 379/433.02 |
| 6,321,070 B1 | | 11/2001 | Clark et al. |
| 6,359,984 B1 | * | 3/2002 | Kim ....................... 379/433.02 |
| 6,490,361 B1 | * | 12/2002 | Klein .......................... 381/345 |
| 6,493,456 B1 | * | 12/2002 | Hansson ..................... 381/345 |

FOREIGN PATENT DOCUMENTS

WO  WO 99/35880  7/1999

* cited by examiner

*Primary Examiner*—Kimberly Lockett
*Assistant Examiner*—Edgardo San Martin
(74) *Attorney, Agent, or Firm*—Marshall, Gerstein & Borun LLP (57) ABSTRACT

An electronic device (100) having a multi-mode acoustic system (120) and a method (500) for radiating sound waves are described herein. The acoustic system (120) generally includes a transducer (530), a first port (510), and a second port (520). The first and second ports (510, 520) may be acoustically coupled to the transducer (530). The second port (520) may be acoustically symmetric relative to the first port (510) such that output from the second port (520) is substantially identical to output from the first port (510).

25 Claims, 6 Drawing Sheets

ELECTRONIC DEVICE HAVING A MULTI-MODE ACOUSTIC SYSTEM AND METHOD FOR RADIATING SOUND WAVES

TECHNICAL FIELD

The present disclosure relates to electronic devices, and more particularly, to an electronic device having a multi-mode acoustic system and a method for radiating sound waves.

BACKGROUND

Electronic devices such as cellular telephones, pagers, personal digital assistants (PDAs), handheld computers, micro-cassette or digital voice recorders, and two-way radios are usually designed with compactness and portability in mind. For example, some cellular telephones are constructed with two portions that fold clamshell-like to conserve space. This design allows the designer to provide multiple modes of operation (e.g., voice message retrieval and voice call origination) in a compact package. In particular, these cellular telephones may include a top portion and a base portion that are rotatably coupled together. Typically, the top portion may include a speaker to convert electrical signals into sound waves in the human-audible frequency range of 20 Hertz (Hz) to 20,000 kilo-Hertz (klz), and ports to emanate the sound waves. Different modes may be available in an open position and in a closed position. For example, a user of a cellular telephone may be able to retrieve a voice message and/or to answer an incoming call with the phone in the open position (i.e., the device is flipped open with the top portion rotated away from the base portion) by placing the speaker adjacent to the user's ear to listen. Although the user may be able to hear sound waves emitted by the speaker when the phone is in the closed position (e.g., phone ring indicating of an incoming call), the user may not be able to retrieve the voice message and/or to answer the incoming call in the closed position. Because the speaker may produce different acoustic frequency responses and amplitudes in the open position and in the closed position, the user may need a set of headphones to operate the same modes when the phone is in the closed position that may be heard through the speaker in the open position (e.g., either to answer or to initiate a voice call). Separate audio paths may be implemented into the phone to provide substantially identical acoustical response in both the open position and the closed position. However, such a design would deteriorate the leak tolerance of the phone (i.e., the seal between the phone and the user's ear) for optimal performance. That is, the air leakage between the phone and the user's ear may cause reproduction of low frequency sound to decrease. As phones reduce in size, the amount of air leakage increases because the contact area between the phone and the user's ear is smaller. Although a switched path design may produce an identical output signal in either the open position or the closed position, the leak tolerance may also suffer without a seal formed by the user's ear. Further, the switched path design may require additional moving parts to the phone and increase cost to manufacture it.

To achieve optimal performance, some cellular telephones may need to be oriented in a particular position. For example, a credit-card size cellular telephone may obtain better reception with the antenna being farthest away from the user's head. The antenna may be disposed within the phone such that the phone may achieve optimal performance when oriented side ways against the user's head. However, the speaker is typically placed in the front-face of the phone such that the user may place the front-face of the phone against the user's ear to listen. Because of the orientation of the antenna and the speaker, the user may not be able to achieve optimal reception and audio quality.

Therefore, a need exists for an acoustic system within an electronic device to provide acceptable audio quality in a variety of modes using the same speaker.

BRIEF DESCRIPTION OF THE DRAWINGS

This disclosure will describe several embodiments to illustrate its broad teachings. Reference is also made to the attached drawings.

DETAILED DESCRIPTION

An electronic device having a multi-mode acoustic system and a method for radiating sound waves are described. The multi-mode acoustic system generally includes a transducer (e.g., a loudspeaker), a first port, and a second port. The transducer may be disposed within a housing having a first side and a second side. In particular, the transducer may be configured to convert electrical signals to sound waves. The first port may be disposed on the first side whereas the second port may be disposed on the second side. For example, the first and second sides of the housing may be opposite of each other so that sound waves may emanate from the front and the rear of the electronic device. Alternatively, the first and second sides may be adjacent to each other. The first and second ports are acoustically coupled to the transducer via a cavity. For example, the cavity may be, but is not limited to, an L-shaped cavity acoustically coupled to the first and second ports. The first port may be configured to operate in a first mode associated with the electronic device whereas the second port may be configured to operate in a second mode associated with the electronic device. Further, the second port may be acoustically symmetric relative to the first port such that output from the second port may be substantially identical to output from the first port (i.e., the impedance of the first and second ports are identical over a frequency range).

Figure 1:
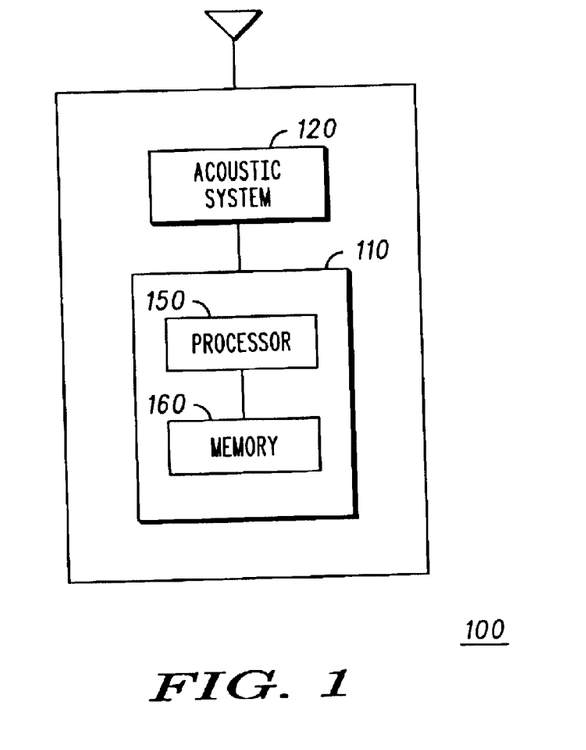
FIG. 1 is a block diagram representation of an electronic device.

Referring to FIG. 1, an electronic device 100 generally includes a controller 110 and an acoustic system 120. The controller 110 includes a processor 150 and a memory 160. The processor 150 is operatively coupled to the memory 160, which stores a program or a set of operating instructions for the processor 150. The processor 150 executes the program or the set of operating instructions such that the electronic device 100 operates as described herein. The program of the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media. The electronic device 100 may include a receiving unit and a transmitting unit (not shown) disposed therein to provide radio frequency (RF) communication.

Although the embodiments disclosed herein are particularly well suited for use with a cellular telephone, persons of ordinary skill in the art will readily appreciate that the teachings herein are in no way limited to such an electronic device. On the contrary, persons of ordinary skill in the art will readily appreciate that the teachings can be employed with other electronic devices such as, but not limited to, a pager, a personal digital assistant (PDA), a handheld computer, a micro-cassette or digital voice recorder, and a radio. To illustrate the concept of a multi-mode acoustic system, the electronic device 100 may be a cellular telephone adapted with the multi-mode acoustic system as shown in FIGS. 2, 3, 4, 7 and 8.

Figure 2:
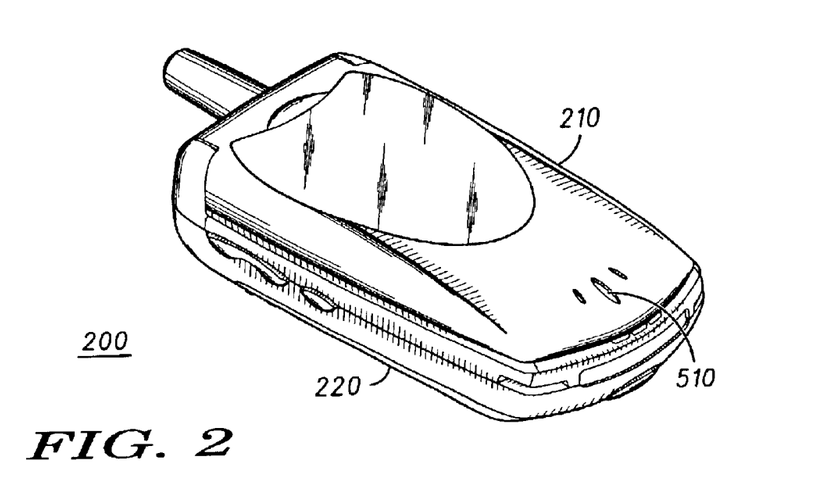
FIGS. 2, 3, 4, 7, and 8 are schematic diagram representations of cellular telephones.
Figure 3:
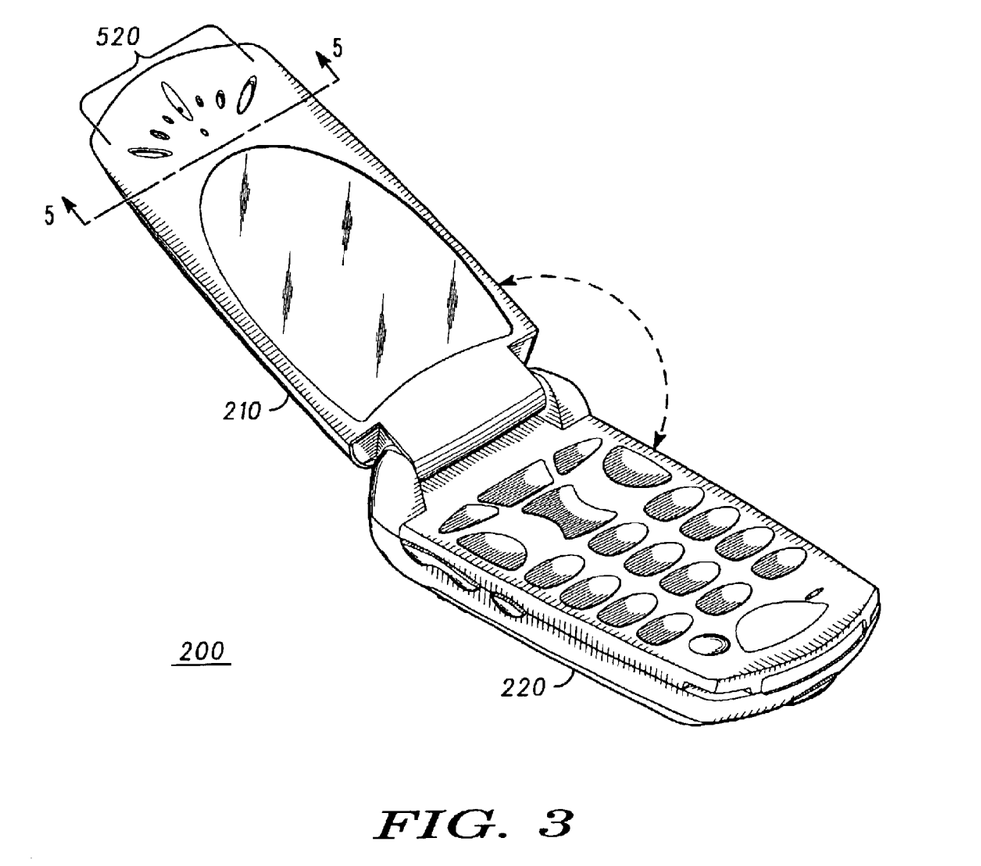

As noted above, the electronic device 100 may be, but is not limited to, a cellular telephone. For example, the electronic device 100 may be a foldable clamshell-like cellular telephone 200 as shown in FIGS. 2 and 3. The phone 200 generally includes a top portion 210 and a base portion 220. The top portion 210 and the base portion 220 may be rotatably coupled to one another as persons of ordinary skill in the art will readily recognize. For example, the top portion 210 and the base portion 220 may be coupled by a hinge. The phone 200 may be adjusted from a first position (i.e., a closed position) as illustrated in FIG. 2 to a second position (i.e., an open position) as illustrated in FIG. 3. Accordingly, the phone 200 may be adjusted from the first position to the second position with the top portion 210 rotating either vertically or horizontally away from the base portion 220 and vice versa.

The phone 200 may operate in a variety of modes such as, but not limited to, a private mode (i.e., the phone 200 is adjacent to the user's ear). In particular, the phone 200 may operate in a first mode in the first position as shown in FIG. 2, and it may operate in a second mode in the second position as shown in FIG. 3. To do so, the top portion 210 of the phone 200 may include a multi-mode acoustic system 120 having a first port 510 (shown in FIG. 2) and a second port 520 (shown in FIG. 3) as described in detail below. For example, a user may retrieve voice messages without unfolding the phone 200 (i.e., in the closed position as shown FIG. 2 where the second port 520 may be sealed) via the first port 510. That is, the user may place the first port 510 adjacent to the user's ear during retrieval of voice messages (i.e., the first mode). Alternatively, the user may unfold the phone 200 (i.e., in the open position as shown in FIG. 3) to initiate and/or to answer a call. The user may place the second port 520 adjacent to the user's ear during the call (i.e., the second mode). In either the first mode or the second mode, the user's ear may provide a load to the acoustic system 120 (i.e., a relative seal created from the user's ear) so that sound waves may be radiated from the acoustic system 120. However, because the first and second ports 510, 520 are acoustically identical, the output from the first and second ports 510, 520 may be substantially identical regardless of the load from the user's ear.

In another example, the first port 510 may generate a narrow band acoustic signal such as, but not limited to, a ring tone in response to the second port 520 being sealed (e.g., the phone 200 is in a closed position as shown in FIG. 2). When the phone 200 is in an open position as shown in FIG. 3, the first and second ports 510, 520 may operate as a speakerphone and generate a wide band acoustic signal.

Figure 5:
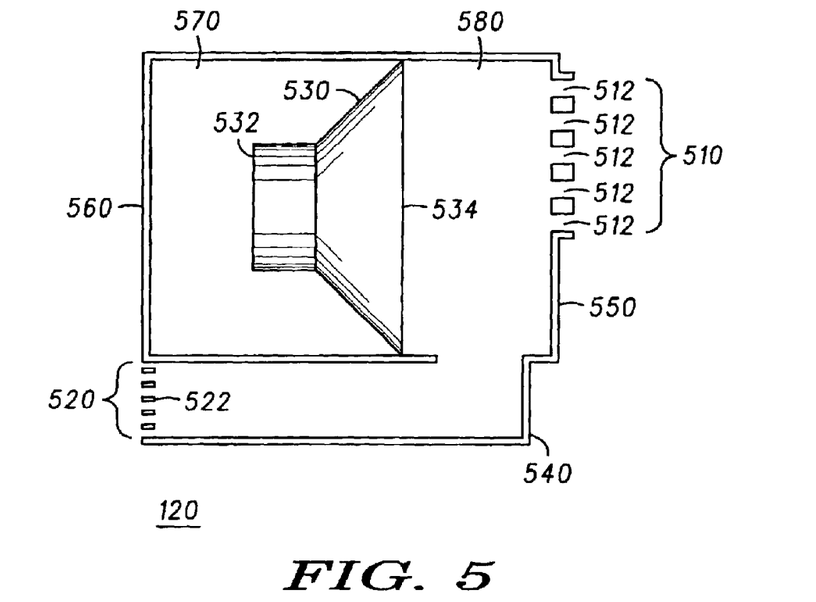
FIGS. 5 and 6 are diagrammatic diagram representations of acoustic systems.

Referring to FIG. 5, the acoustic system 120 generally includes the first port 510, the second port 520, and a transducer 530. The transducer 530 (e.g., a loudspeaker) may be disposed within a housing 540 with a first portion 550 and a second portion 560. The first port 510 may be disposed on the first portion 550 whereas the second port 520 may be disposed on the second portion 560. The first portion 550 may be, but is not limited to, a front portion of the phone 200. The second portion 560 may be, but is not limited to, a rear portion of the phone 200. Because the first and second portion 550, 560 are opposite of one another, the first port 510 and the second port 520 may face opposite of one another.

Further, the housing 540 may include a first cavity 570 and a second cavity 580. The first cavity 570 may be free space intermediate of the housing 540 and a rear portion 532 of the transducer 530 (i.e., a sealed-off enclosure). The second cavity 580 may be free space intermediate of the first port 510 and a front portion 534 of the transducer 530. In particular, the second cavity 580 may be configured as an L-shape passage. Accordingly, the second cavity 580 may also be free space intermediate of the second port 520 and the transducer 530. The first and second ports 510, 520 may be, but are not limited to, a hole, a slot, a slit, a groove, a notch, and an opening. For example, the first port 510 may be five (5) openings with a damping material 512 (e.g., a felt or a grilled cloth) covering the openings whereas the second port 520 may be a single slot covered by a different damping material 522 so that the first and second ports 510, 520 may have identical impedance. Although the structures of the first and second ports 510, 520 may not be physically and/or mechanically identical, the first and second ports 510, 520 may be acoustically symmetric because of the configuration of the second cavity 580. That is, the first and second ports 510, 520 may have substantially identical impedance over a frequency range so that the outputs of the first and second ports 510, 520 are substantially identical.

A basic flow of the acoustic system 120 shown in FIG. 5 may start with the transducer 530 converting electrical signals into sound waves as persons of ordinary skill in the art will readily recognize into the second cavity 580. From the front portion 550 (e.g., front) of the acoustic system 120, the first port 510 may emanate sound waves from the second cavity 580 in the air from the electronic device 100. Sound waves may travel through the second cavity 580 and through the second port 520 in the rear portion 560 (e.g., back) of the acoustic system 120 into the air. Because the first and second ports 510, 520 may be acoustically symmetric to one another, sound waves from the first and second ports 510, 520 may be substantially identical. That is, the first and second ports 510, 520 may have identical impedance so that the acoustic system 120 may provide the same acoustical response from either the first port 510 or the second port 520 when placed against the user's ear.

Figure 4:
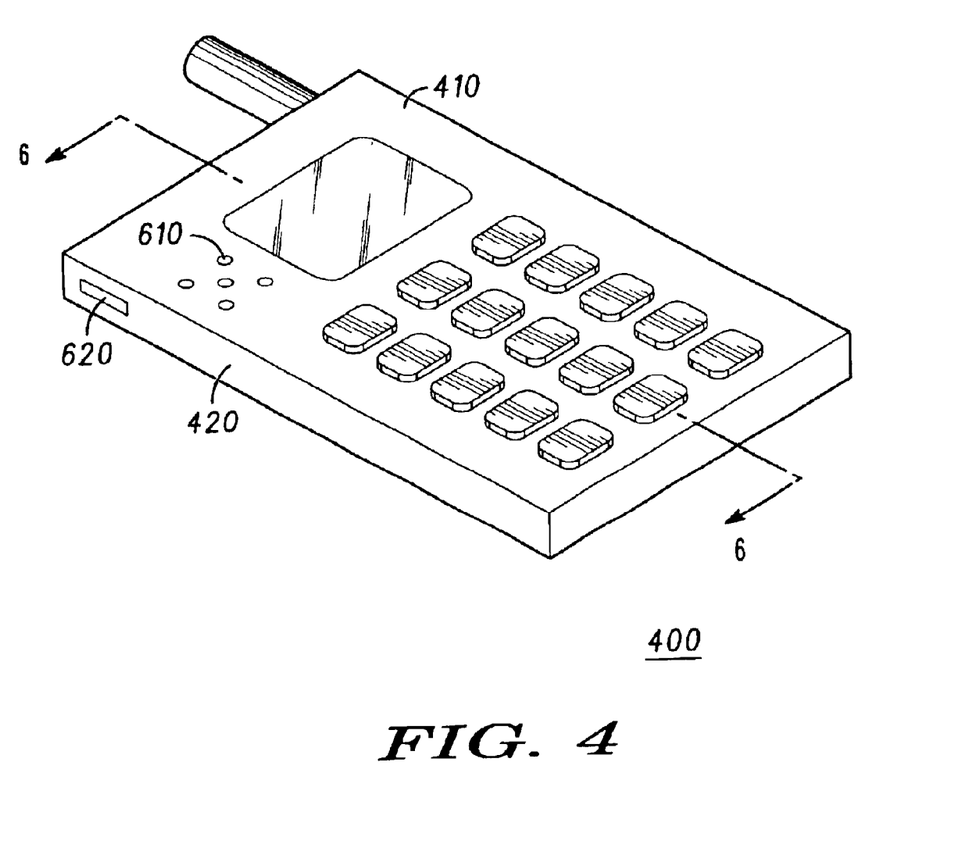
Figure 6:
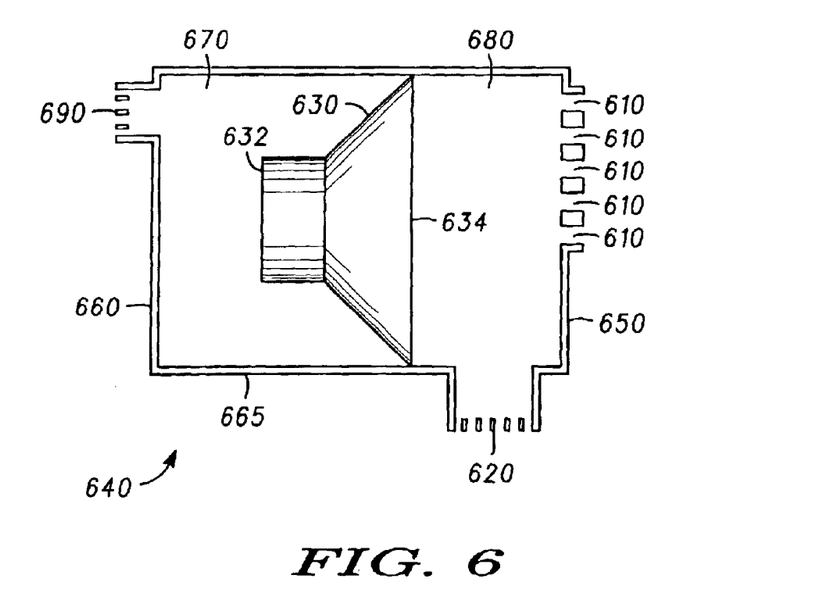
Figure 7:
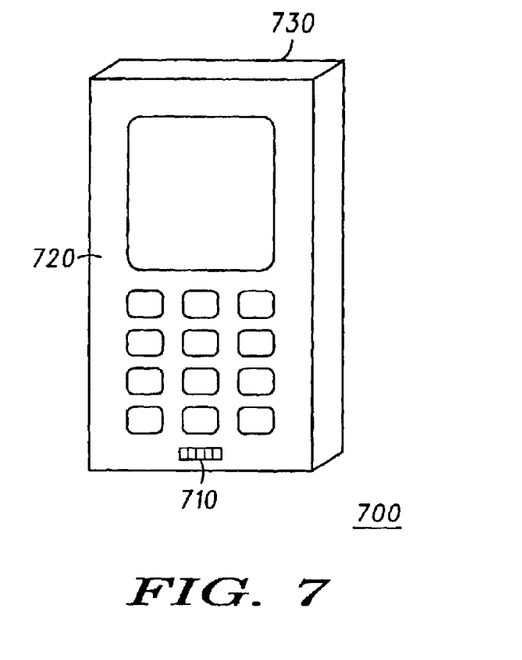
Figure 8:
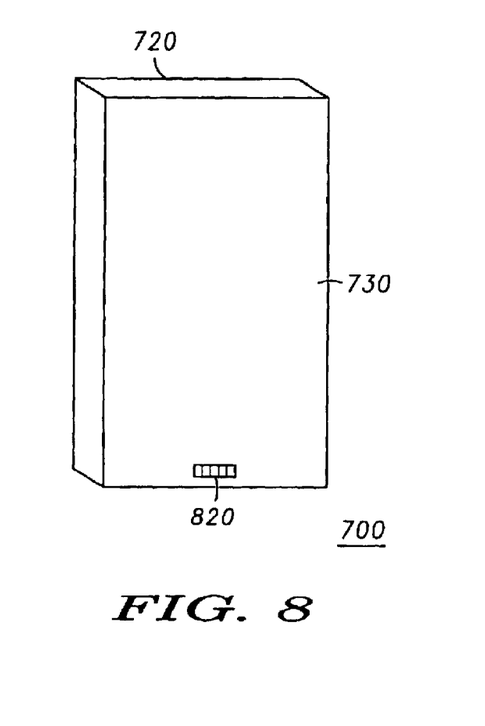

Alternatively, the second port 520 shown in FIG. 5 may be implemented on a side of the electronic device 100 such as, but not limited to, a credit card-sized cellular telephone (one shown as 400 in FIG. 4). Referring to FIGS. 4 and 6, a first port 610 may be disposed on a front face 410 (i.e., similar to the first port 510 shown in FIG. 5) whereas a second port 620 may be disposed on a side 420 (i.e., any side adjacent to the front face 410) of the phone 400. In addition to the first port 610 and the second port 620, the acoustic system 120 generally includes a transducer 630 and a housing 640 having a front portion 650, a rear portion 660, and a side 665. The first and second ports 610, 620 may be acoustically symmetric to one another in a similar manner as the first and second ports 510, 520 shown in FIG. 5. Referring back to FIG. 6, the first port 610 may be disposed on the front portion 650 of the housing 640. However, here, the second port 620 may be disposed on the side 665 of the housing 640 rather than on a rear portion of the acoustic system 120 as shown in FIG. 5. The second cavity 680 may be free space intermediate of a front portion 634 of the transducer 630 and both the first and second ports 610, 620. Because of physical size limitation of the phone 400, the acoustic system 120 may also include a third port 690 (i.e., a rear port) on the rear portion 660 of the housing 640 to tune the volume of air in the first cavity 670 for optimal results. In particular, the first cavity 670 may be free space intermediate of the third port 690 and a rear portion 632 of the transducer 630.

Persons of ordinary skill in the art will appreciate that the first and second ports 510, 520, 610, and 620 can be implemented in any of many different ways utilizing any of many different shapes and size. Thus, although particular configurations of the first and second ports 510, 520, 610, and 620 are illustrated in FIGS. 5 and 6, persons of ordinary skill in the art will appreciate that the first and second ports 510, 520, 610, and 620 can be configured in other shapes and size. The configurations of the first and second ports 510, 520, 610, and 620 shown in FIGS. 5 and 6 are merely provided as examples.

As noted above, the electronic device 100 may operate in a variety of modes. In particular, the electronic device 100 may be a cellular telephone 700 as shown FIGS. 7 and 8 operable in a handsfree mode (i.e., speakerphone) using the multi-mode acoustic system 120 as described above. Here, the phone 700 generally includes a first port 710 (shown in FIG. 7) and a second port 820 (shown in FIG. 8). The first port 710 may be disposed on a front portion 720 of the phone 700 (shown in FIG. 7) whereas the second port 820 may disposed on a rear portion 730 of the phone 700 (shown in FIG. 8). When the phone 700 is placed on a surface, the load of the surface may replace the load of the user's ear so that sound waves may radiate from either the first port 710 or the second port 820. For example, sound waves may radiate from the first port 710 when the phone 700 is placed on the rear portion 730. Alternatively, when the phone 700 is placed on the front portion 720, sound waves may radiate from the second port 820. Because the first and second ports 710, 820 are acoustically symmetric to one another, the sound waves from either of the first and second ports 710, 820 may be substantially identical.

Figure 9:
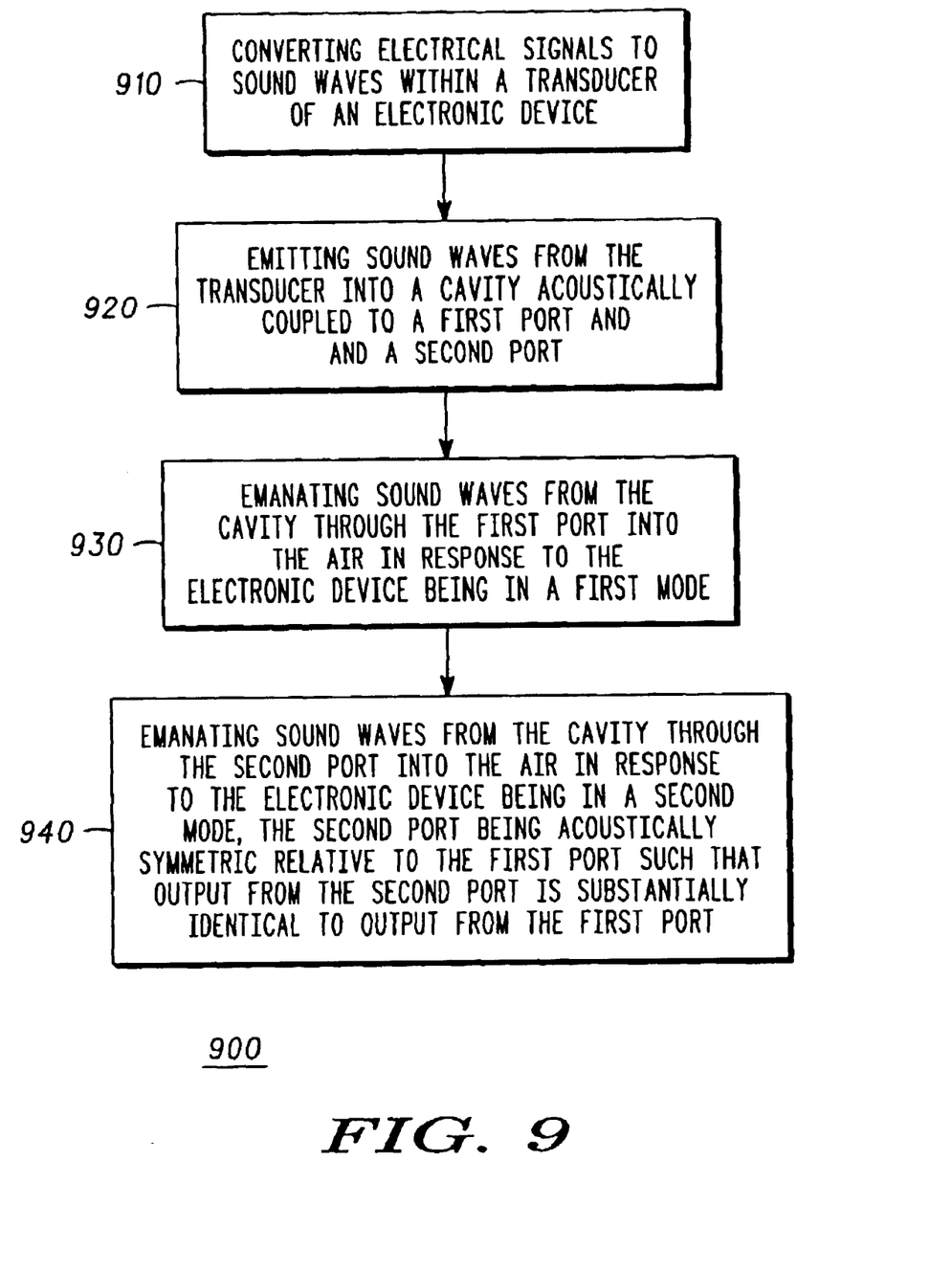
FIG. 9 is a flow diagram illustrating a method for radiating sound waves from an electronic device.

Referring to FIG. 9, a basic flow for radiating sound waves from the electronic device 100 shown in FIG. 1 may start with converting electrical signals into sound waves within a transducer at step 910. In particular, the transducer may convert electrical signals into sound waves in the human-audible frequency range of 20 Hertz (Hz) to 20,000 kilo-Hertz (kHz). At step 920, the transducer may emit sound waves into a cavity acoustically coupled to a first port and a second port. For example, the cavity may be, but is not limited to, an L-shape cavity such that sound waves may be emanated from opposite sides of the electronic device. In particular, the first port at step 930 may emanate sound waves from the cavity into the air in response to the electronic device being in a first mode (e.g., an open position). For example, the cellular telephone may be a foldable-clamshell cellular telephone such that a user may unfold the cellular telephone to answer an incoming call. Alternatively, the second port at step 940 may emanate sound waves from the cavity through the second port into the air in response to the electronic device being in a second mode. The second port may be acoustically symmetric relative to the first port such that output from the second port is substantially identical to output from the first port. Following the example described above, the second mode may be, but is not limited to, a closed position. Accordingly, the user may be able to retrieve voice messages without unfolding the cellular telephone.

Many changes and modifications to the embodiments described herein could be made. The scope of some changes is discussed above. The scope of others will become apparent from the appended claims.

What is claimed is:

1. An acoustic system for an electronic device, the acoustic system comprising:

a housing having a first side and a second side, the sides being disposed opposite each other;

a transducer;

a cavity acoustically coupled to the transducer;

a first port disposed in the first side, acoustically coupled to the cavity, the first port being operable in a first mode associated with the electronic device; and a second port disposed in the second side, acoustically coupled to the cavity, the second port being operable in a second mode associated with the electronic device and being acoustically symmetric relative to the first port such that output from the second port during the second mode is substantially identical to output from the first port during the first mode, whereby the transducer is acoustically coupled to the first and second ports by the cavity.

2. The acoustic system of claim 1, wherein the first port is a port having a first impedance and the second port is a port having a second impedance, the first and second impedances are identical over a frequency range.

3. The acoustic system of claim 1, wherein the cavity is L-shaped.

4. The acoustic system of claim 1, wherein each of the first and second ports is a hole, a slot, a slit, a groove, a notch, or an opening.

5. The acoustic system of claim 1, wherein each of the first and second ports is configured to generate a frequency response in response to the port being adjacent to an ear of a user.

6. The acoustic system of claim 1, wherein one of the first and second ports is configured to generate a frequency response in response to the other one of the first and second ports being adjacent to a surface.

7. The acoustic system of claim 1, wherein the electronic device is a cellular telephone, a pager, a handheld computer, a personal, digital assistant (PDA), a micro-cassette recorder, a digital voice recorder, or a radio.

8. An electronic device having a multi-mode acoustic system, the acoustic system comprising:

a housing having a first side, a second side opposite the first side, and a cavity between the first and second sides;

a sound source disposed within the housing, the sound source being acoustically coupled to the cavity, the sound source configured to convert electrical signals to sound waves;

a first porting structure disposed on the first side, the first porting structure being acoustically coupled to the cavity and configured to carry sound waves from the sound source into the air in a first mode associated with the electronic device; and a second porting structure disposed on the second side, the second porting structure acoustically coupled to the cavity, the second porting structure being configured to carry sound waves from the sound source into the air in a second mode associated with electronic device and being acoustically symmetric relative to the first porting structure such that output from the second porting structure is substantially identical to output from the first porting structure.

9. The electronic device of claim 8, wherein the first porting structure is a porting structure having a first impedance and the second porting structure is a porting structure having a second impedance, the first and second impedances are identical over a frequency range.

10. The acoustic device of claim 8, wherein each of the first and second porting structures is configured to generate a frequency response in response to the structure being placed to an ear of a user.

11. The acoustic device of claim 8, wherein one of the first and second porting structures is configured to generate a frequency response in response to the other one of the first and second porting structures being adjacent to a surface.

12. The electronic device of claim 8, wherein the cavity is L-shaped.

13. The electronic device of claim 8, wherein each of the first and second porting structures is a hole, a slot, a slit, a groove, a notch, or an opening.

14. The electronic device of claim 8, wherein the electronic device is a cellular telephone, a pager, a handheld computer, and a personal digital assistant (PDA), a micro-cassette recorder, a digital voice recorder, or a radio.

15. A method for radiating sound waves from an electronic device, the method comprising:
converting electrical signals to sound waves within a transducer;
emitting sound waves from the transducer into a cavity, the cavity acoustically coupled to a first port and a second port, the first and second ports disposed on opposite sides of a housing;
emanating sound waves from the cavity through the first port into the air in response to the electronic device being in a first mode; and
emanating sound waves from the cavity through the second port into the air in response to the electronic device being in a second mode, the second port being acoustically symmetric relative to the first port such that output from the second port is substantially identical to output from the first port.

16. The method of claim 15, wherein the step of emitting sound waves from the transducer into the cavity comprises emitting sounds waves from the transducer into an L-shaped cavity acoustically coupled to the first and second ports.

17. The method of claim 15, wherein the step of emitting sound waves from the transducer into a cavity acoustically coupled to a first port and a second port comprises emitting sound waves from the transducer into a cavity acoustically coupled to ports having identical impedance over a frequency range.

18. The method of claim 15, wherein the step of emanating sound waves from the cavity through the first port into the air in response to the electronic device being in a first mode comprises emanating sound waves from the cavity through a hole, a slot, a slit, a groove, a notch, or an opening into the air.

19. The method of claim 15, wherein the step of emanating sound waves from the cavity through the first port into the air in response to the electronic device being in a first mode comprises emanating sound waves from the cavity through the first port into the air in response to the first port being adjacent to an ear of a user.

20. The method of claim 15, wherein the step of emanating sound waves from the cavity through the first port into the air in response to the electronic device being in a first mode comprises emanating sound waves from the cavity in response to the second port being adjacent to a surface.

21. The method of claim 15, wherein the step of emanating sound waves from the cavity through the second port into the air in response to the electronic device being a second mode comprises emanating sound waves from the cavity through a hole, a slot, a slit, a groove, a notch, or an opening into the air.

22. The method of claim 15, wherein the step of emanating sound waves from the cavity through the second port into the air in response to the electronic device being in a second mode comprises emanating sound waves from the cavity through the second port into the air in response to the second port being adjacent to an ear of a user.

23. The method of claim 15, wherein the step of emanating sound waves from the cavity through the second port into the air in response to the electronic device being in a second mode comprises emanating sound waves from the cavity through the second porting into the air in response to the first port being adjacent to a surface.

24. The method of claim 15, wherein the electronic device is a cellular telephone, a pager, a handheld computer, a personal digital assistant (PDA), a micro-cassette recorder, a digital voice recorder, or a radio.

25. An electronic device having an acoustic configuration to radiate sound waves, the electronic device comprises:
a housing having a first portion rotatably coupled to a second portion;
a sound source disposed within the housing, the sound source being configured to emit sound waves into a first cavity from a front side and to emit sound waves into a second cavity from a rear side;
a first porting structure disposed on a side of the first portion, the first porting structure being acoustically coupled to the first cavity;
a second porting structure disposed on an opposite side of the first portion and acoustically coupled to the second cavity, the second porting structure configured to generate a narrow band acoustic signal in response to the first porting structure being sealed; and
the first and second porting structures configured to generate a wide band acoustic signal in response to the housing being in an open position.

* * * * *

UNITED STATES PATENT AND TRADEMARK OFFICE
CERTIFICATE OF CORRECTION

PATENT NO. : 6,758,303 B2
DATED : July 6, 2004
INVENTOR(S) : Robert A. Zurek et al.

It is certified that error appears in the above-identified patent and that said Letters Patent is hereby corrected as shown below:

<u>Column 6,</u>
Line 46, please delete "a personal, digital assistant" and insert -- a personal digital assistant --.

Signed and Sealed this

Eighth Day of February, 2005

JON W. DUDAS
*Director of the United States Patent and Trademark Office*